3,328,494
O-(2-NAPHTHYL) PHOSPHOROTHIONATES
Bernard Buchner, Westfield, and Erwin Jacoves, Elizabeth, N.J., assignors, by mesne assignments, to Continental Oil Company, a corporation of Delaware
No Drawing. Filed Nov. 5, 1963, Ser. No. 321,419
10 Claims. (Cl. 260—959)

As disclosed in copending, coassigned patent application Ser. No. 295,531 filed July 16, 1963, O-(2-naphthyl) phosphorodichloridothionate possesses herbicidal and other useful properties. This compound however is reactive with ingredients of certain natural soils. Therefore, without specific protection, it may show low activity in preemergent application in certain soils.

One of the objects of this invention is to replace one or both of the chlorine atoms of this compound with other suitable radicals to produce novel compounds with herbicidal and other useful activity. Another object is to prepare new herbicidal compositions. Other objects will become clear from the description below.

The general structural formula of the compounds of this invention is

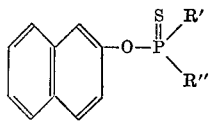

wherein R' is a member of the class consisting of O-alkyl radicals, amine radicals and chlorine, wherein R" is a member of the class consisting of O-alkyl, O-aryl and amine radicals and wherein said amine radicals have the general structural formula of

said $R_{(1)}$ and $R_{(2)}$ being a member of the class consisting of hydrogen and alkyl radicals. The alkyl radicals, both in the O-alkyl and in the amine radicals have 1 to 5 carbon atoms. The aryl radicals may be substituted in the aromatic ring, such as by alkyl, alkoxy and halogen groupings.

The compounds of this invention can be classified into 5 groups, with the fifth group having two subdivisions.

Group 1.—Both chlorine atoms substituted by O-alkyl groups, Compound No. 1: O-(2-naphthyl), O',O"-dimethyl phosphorothionate and Compound No. 2: O-(2-naphthyl), O',O"-diethyl phosphorothionate.

Group 2.—Both chlorine atoms N-substituted by amine radicals, e.g. Compound No. 3: O-(2-naphthyl), N,N'-phosphorodiamidothionate and Compound No. 4: O-(2-naphthyl), N,N'-bis(dimethyl) phosphorodiamidothionate.

Group 3.—One chlorine atom substituted with an O-aryl radical, e.g. Compound No. 5: O-(2-naphthyl), O'-(2,4 - dichlorophenyl) phosphorochloridothionate and Compound No. 6: O-(2-naphthyl), O'-(p-cresyl) phosphorochloridothionate.

Group 4.—One chlorine atom substituted with an amine radical, e.g. Compound No. 7: O-(2-naphthyl), N,N-dimethyl phosphoramidochloridothionate, Compound No. 8: O-(2-naphthyl), N,N-diethyl phosphoramidochloridothionate, Compound No. 9: O-(2-naphthyl), N-propyl phosphoramidochloridothionate and Compound No. 10: O-(2-naphthyl), N-isopropyl phosphoramidochloridothionate.

Group 5.—One chlorine atom substituted with an O-alkyl radical and the second chlorine atom substituted with an N-alkyl radical. This group may be subdivided into two subgroups. Subgroup (A) (with O-methyl radicals) e.g. Compound No. 11: O-(2-naphthyl), O'-methyl, N,N-dimethyl phosphoroamidothionate, Compound No. 12: O-(2-naphthyl), O'-methyl, N,N-diethyl phosphoramidothionate, Compound No. 13: O-(2-naphthyl), O'-methyl, N-propyl phosphoramidothionate and Compound No. 14: O-(2-naphthyl), O'-methyl, N-isopropyl phosphoramidothionate and Subgroup (B) (with O-ethyl radicals) e.g. Compound No. 15: O-(2-naphthyl), O'-ethyl, N,N-dimethyl phosphoramidothionate, Compound No. 16: O-(2-naphthyl), O'-ethyl, N,N-diethyl, phosphoramidothionate, Compound No. 17: O-(2-naphthyl), O'-ethyl, N-propyl phosphoramidothionate and Compound No. 18: O-(2-naphthyl), O'-ethyl, N-isopropyl phosphoramidothionate.

The preparation of these compounds is set forth in the illustrative examples below.

The compounds of Group 1, can be prepared by reacting the corresponding alkali metal alcoholate, e.g. sodium methoxide or sodium ethoxide, with the O-(2-naphthyl) phosphorodichloridothionate. However, it has been found that excess alcohol reacts also simply and efficiently, even in the absence of acid acceptors. Examples 1 and 2 are illustrative of this embodiment of the invention.

EXAMPLE 1.—PREPARATION OF O-(2-NAPHTHYL), O',O" - DIMETHYL PHOSPHOROTHIONATE (COMPOUND NO. 1)

To 69.2 grams (0.25 mol) of O-(2-naphthyl) phosphorodichloridothionate was added 250 ml. of methanol at room temperature. The mixture was then heated to reflux under a vacuum of 200 mm. Hg for two hours. Hydrogen chloride formed as a by-product was removed continuously under vacuum. On completion of the reaction, the excess methanol was removed by distillation at 60–70° C. at 200 mm. The residual product was fractionated over a boiling range of 143–146° C. at 1 mm. Hg pressure. O-(2-naphthyl), O',O"-dimethyl phosphorothionate was recovered in 80% yield. The product was identified by elemental and infrared spectral analysis. The refractive index, $N_D^{20}$, was 1.5997 and the density, $D_{20}^{20}$, 1.2479.

EXAMPLE 2.—PREPARATION OF O-(2-NAPHTHYL), O',O"-DIETHYL PHOSPHOROTHIONATE (COMPOUND NO. 2)

To 69.2 grams (0.25 mol) of O-(2-naphthyl) phosphorodichloridothionate was added 250 ml. of ethanol. The solution was stirred and heated under reflux at 40–50° C. and 200 mm. Hg vacuum for three hours. The hydrogen chloride which formed was removed continuously under vacuum. On completion of the reaction, the excess ethanol was removed by distillation and the crude product which remained in the residue was distilled further through a Vigreux column at 151–154° C. under a vacuum of 800–1000 microns. The product, O-(2-naphthyl), O',O"-diethyl phosphorothionate, was identified by its elemental analysis and infrared spectrum. The refractive index $N_D^{20}$ was 1.5728 and the density $D_{24}^{24}$ 1.266.

The reactions of Examples 1 and 2 take place at ambient temperature and do not require an acid acceptor. An alternative process uses sodium methoxide or sodium ethoxide, respectively, added dropwise to the phosphorodichloridothionate dissolved in the alcohol. Addition occurs at 30–40° C., after which the mixture is kept at 20–25° C. for 3–4 hours. The reaction product is in solution and is separated by filtration from the sodium chloride solids. The solution is then concentrated under vacuum and the product recovered.

EXAMPLE 3.—PREPARATION OF O-(2-NAPH-THYL), N,N'-PHOSPHORODIAMIDOTHIONATE (COMPOUND NO. 3)

To a solution of 69.2 grams (0.25 mol) of O-(2-naphthyl)phosphordichloridothionate in 500 ml. of benzene was added under constant stirring 17 grams (1.0 mol) of gaseous ammonia at 10°–20° C. By use of a Dry Ice-acetone cold trap, unreacted ammonia was condensed and returned to the reaction vessel. On completion of the reaction, the mixture was cooled to 10° C., whereupon the precipitate, which was insoluble in benzene, was removed by filtration. The residue was washed thrice with water to remove the ammonium chloride and the aqueous portion discarded. The water-washed residue was then dried. The product, O-(2-naphthyl), N,N''-phosphorodiamidothionate

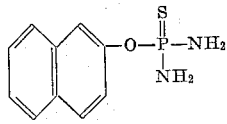

was obtained in 95–100% yield, melted at 184–185° C., and identified by elemental analysis.

EXAMPLE 4.—PREPARATION OF O-(2-NAPH-THYL), N,N'-BIS(DIMETHYL) PHOSPHORODI-AMIDOTHIONATE (COMPOUND NO. 4)

To a solution of 69.2 grams (0.25 mol) of O-(2-naphthyl) phosphorodichloridothionate in 500 ml. of benzene were added slowly 54 grams (1.2 mols) of dimethylamine at 20° C. After the reaction was completed, the mixture was cooled to 10° C. and the dimethylamine hydrochloride which formed was removed by filtration. The filtrate (benzene solution of the product) was washed with water to remove small amounts of dimethylamine hydrochloride. Benzene was then removed by distillation at 80–90° C. under a vacuum of 20 mm. Hg. The solid which was recovered in good yield was recrystallized twice from methanol. The purified product gave a melting point of 93–94° C. and was identified as O-(2-naphthyl), N,N'- bis(dimethyl) phosphoramidothionate by elemental analysis. In Example 4, one of the reactants, dimethylamine, was also an acid acceptor.

The product of Example 3 is insoluble in benzene, water and most organic solvents. It can be recrystallized from acetone. The product of Example 4 was benzene soluble and could easily be recrystallized from methanol. Both were formed close to room temperature.

In the case of the compounds of Group 3, only one chlorine atom of the phosphorodichloridothionate is reacted and substituted. In their preparation triethylamine was used as acid acceptor and ethyl ether as a polar solvent in order to facilitate the removal of the chlorine atom. Examples 5 and 6 describe the preparation of two illustrative products.

EXAMPLE 5.—PREPARATION OF O-(2-NAPH-THYL), O'-(2,4-DICHLOROPHENYL) PHOSPHOROCHLORIDOTHIONATE (COMPOUND NO. 5)

To 63.4 grams of O-(2-naphthyl) phosphorodichloridothionate (0.23 mol) were added 200 ml. of ether and the resulting mixture heated to reflux temperature. A solution of 37.3 grams of 2,4-dichlorophenol (0.23 mol) and 24 grams of triethylamine (0.23 mol) was then prepared in 400 ml. of ethyl ether and the solution added in increments at the refluxing temperature of the first mentioned mixture. The resulting reaction mixture was then heated to reflux for five hours and cooled to —10° C. and filtered to remove the triethylamine hydrochloride. The solvent was then removed by distillation under vacuum at 46–60° C. at 40 mm. Hg. The resulting crude product was washed with water, filtered and dried. The resulting product O-(2-naphthyl) O'-(2,4-dichlorophenyl) phosphorochloridothionate was recovered and identified by elemental analysis. This product had the appearance of an amber oil, had a refractive index $N_D^{20}$ 1.168 and appeared to be a skin irritant.

EXAMPLE 6.—PREPARATION OF O-(2-NAPH-THYL), O'-(p-CRESYL) PHOSPHOROCHLORIDOTHIONATE (COMPOUND NO. 6)

To 69.2 grams of O-(2-naphthyl) phosphorodichloridothionate (0.25 mol) were added 300 ml. of ethyl ether and the mixture heated to refluxing temperature. Paracresol in the amount of 27 grams (0.25 mol) and 25.3 grams of triethylamine (0.25 mol) were then dissolved in 100 ml. of ethyl ether and the solution added with agitation to the first mentioned mixture, while maintaining the temperature of the resulting reaction mixutre at refluxing temperature. The reaction mixture was refluxed for three hours, cooled to —10° C. and the triethylamine hydrochloride and the solid product obtained removed by filtration. The separated precipitate was washed with water to remove triethylamine hydrochloride and the water-insoluble product recrystallized from methanol. The product was insoluble in cold ether and in water and had a melting point of 76–78° C. The product recovered was O-(2-naphthyl), O'-(p-cresyl) phosphorochloridothionate. The elemental analysis was in agreement with the theoretical. Yield was 73%.

The four compounds of Group 4 are derivatives of aliphatic amines. Also in this group only one of the chlorine atoms is substituted. Examples 7 to 10 illustrate preparation of these compounds.

EXAMPLE 7.—PREPARATION OF O - (2 - NAPH-THYL), N,N - DIMETHYL PHOSPHORAMIDOCHLORIDOTHIONATE (COMPOUND NO. 7)

Dimethylamine in the amount of 45 grams (1.0 mol) was added incrementally to a solution of 277 grams of O-(2-naphthyl) phosphorodichloridothionate (1.0 mol), and of 101 grams of triethylamine (1.0 mol), dissolved in 500 ml. of benzene. Upon completion of the addition, the resulting reaction mixture was cooled to 10° C. and the triethylamine hydrochloride removed by filtration. The filtrate was washed with water and the solvent removed by vacuum distillation. The crude product was then distilled in a molecular still at 70–80° C. at 1 mm. Hg to remove low boiling by-products and the remaining product distilled at 170–180° C. at 30 microns Hg. O-(2-naphthyl), N,N-dimethyl phosphoramidochloridothionate was obtained at a yield of 68% and exhibited a melting point of 49–51° C. and a boiling range at 30–50 micron Hg of 170–180° C.

EXAMPLE 8.—PREPARATION OF O - (2 - NAPH-THYL), N,N - DIETHYL PHOSPHORAMIDOCHLORIDOTHIONATE (COMPOUND NO. 8)

A solution of 277 grams of O-(2-naphthyl) phosphorodichloridothionate (1.0 mol) was prepared in 750 ml. benzene and heated to reflux temperature. Thereupon a solution of 73 grams of diethylamine (1.0 mol) and 101 grams of triethylamine (1.0 mol) dissolved in 200 ml. of benzene was added with stirring to the first mentioned solution at refluxing temperature. The resulting mixture was heated under reflux for four hours, then cooled to 10° C. and filtered to remove the triethylamine hydrochloride. The filtrate was washed four times with 500 ml. of water and then with 500 ml. of a 0.5% aqueous sodium bicarbonate solution. The solvent was removed from the washed filtrate by vacuum distillation at 80–90° C. The crude product was then distilled in a molecular still at 90–100° C. at 10 mm. vacuum to remove low boiling by-products and residual solvent. The product then was distilled in the molecular still at 170–195° C. at a vacuum of ½ to 1 mm. Hg and O-(2-naphthyl), N,N-diethyl phosphoramidochloridothionate was obtained at a yield of 86%. The boiling range of this purified product at 500 micron was 163–166° C. and its refractive index $N_D^{20}$ was 1.6002 and its density $D_{20}^{20}$ was 1.263.

EXAMPLE 9.—PREPARATION OF O-(2-NAPHTHYL), N-PROPYL PHOSPHORAMIDOCHLORIDOTHIONATE (COMPOUND NO. 9)

O-(2-naphthyl) phosphorodichloridothionate in the amount of 277 grams (1.0 mol) was first dissolved in 750 ml. of ethyl ether and the solution heated to refluxing temperature. N-propylamine in the amount of 59 grams (1.0 mol) and 101 grams of triethylamine (1.0 mol) were then dissolved in 250 ml. of ethyl ether and this solution added incrementally with stirring to the first mentioned solution, while maintaining refluxing temperature. The resulting mixture was refluxed for two hours, cooled to —20° C. and the triethylamine hydrochloride removed by filtration. The solvent was stripped under vacuum distillation and the crude product was fractionated in a molecular still, distilled. The product, obtained in 90% yield, distilled at 190–250° C. at 30–200 microns exhibited the following properties: refractive index $N_D^{20}$ 1.6178, density $D_{20}^{20}$ 1.2496, boiling range at 30–100 microns: 230–250° C.

EXAMPLE 10.—PREPARATION OF O-(2-NAPHTHYL), N-ISOPROPYL PHOSPHORAMIDOCHLORIDOTHIONATE (COMPOUND NO. 10)

O-(2-naphthyl) phosphorodichloridothionate in the amount of 57.2 grams (0.2 mol) was dissolved in 250 ml. of ethyl ether and heated to refluxing temperature. Isopropylamine in the amount of 12.2 grams (0.2 mol) and 20.8 grams of triethylamine (0.2 mol) were then dissolved in 250 ml. of ether and this solution incrementally added with stirring to the first mentioned solution, while maintaining the solution at refluxing temperature. The resulting reaction mixture was heated for four hours under reflux and then cooled to —20° C. and the triethylamine hydrochloride removed by filtration. The solvent was then removed by vacuum distillation (40 mm. Hg) at 40–60° C. and the residual solid was recrystallized from petroleum ether. O-(2-naphthyl), N-isopropyl phosphoroamidochloridothionate was recovered in 90% yield and exhibited a melting point of 73–75° C.

In Examples 7 to 10 triethylamine was used as acid acceptor. Examples 7 and 8 had benzene and Examples 9 and 10 had ethyl ether as solvent. Compounds No. 7 and 10 were solids at room temperature, whereas Compounds No. 8 and 9 were liquids.

The compounds of Group 5 were made from the compounds of Group 4. Compounds No. 11 to 14 were made by reacting sodium methoxide with the respective parent compound, resulting in O-methyl substitutions of the remaining chlorine atom. Compounds No. 15 to 18 were made by reacting sodium ethoxide with the same four parent compounds. Compounds No. 11 to 14 represent Sub-group (A) and Compounds No. 15 to 18 represent Subgroup (B).

EXAMPLE 11.—PREPARATION OF O-(2-NAPHTHYL), O'-METHYL, N,N-DIMETHYL PHOSPHORAMIDOTHIONATE (COMPOUND NO. 11)

O-(2-naphthyl), N,N-dimethyl phosphoramidochloridothionate (Compound No. 7) in the amount of 71.3 grams (0.25 mol) was dissolved in 300 ml. of methanol and the solution heated to refluxing temperature. Sodium methoxide in the amount of 13.5 grams (0.25 mol) was then dissolved in 200 ml. of methanol and added to the first mentioned solution. The resulting reaction mixture was then refluxed for five hours, cooled to —20° C. and filtered. The solids contained a mixture of sodium chloride, the main product and byproducts. The solids were treated with 500 ml. of water and stirred for two hours, then filtered to remove the aqueous solution of the sodium chloride. The reaction product was recrystallized from methanol and had a melting point of 71–72° C. O-(2-naphthyl), O'-methyl, N,N-dimethyl phosphoramidothionate was the reaction product. The elemental analysis agreed with the calculated values.

EXAMPLE 12.—PREPARATION OF O-(2-NAPHTHYL), O'-METHYL, N,N-DIETHYL PHOSPHORAMIDOTHIONATE (COMPOUND NO. 12)

The initial part of reaction of this example was carried out as in Example 11. The reactants were: Solution I—78.4 grams of O-(2-naphthyl), N,N-diethyl phosphoramidochloridothionate Compound No. 8 (0.25 mol) were dissolved in 300 ml. methanol. Solution II—13.5 grams of sodium methoxide (NaOCH₃) (0.25 mol) were dissolved in 100 ml. of methanol. Solution II was added dropwise to Solution I at refluxing temperature. Refluxing was continued for three hours. Part of the sodium chloride was removed at 0° C. by filtration and the methanol was removed by distillation at 60–70° C. and at 20 mm. Hg. The residual sodium chloride was then removed by filtration. The filtrate was distilled in a molecular still and the product distilled at 500 microns between 230° and 250° C. leaving some byproducts as residue in the still. O-(2-naphthyl), O'-methyl, N,N-diethyl phosphoramidothionate was obtained as product having a boiling range at 400–700 microns of 230–250° C. a refractive index $N_D^{20}$ of 1.5937 and a density $D_{20}^{20}$ of 1.221. The product was identified by elemental analysis and infrared spectra.

EXAMPLE 13.—PREPARATION OF O-(2-NAPHTHYL), O'-METHYL, N-PROPYL PHOSPHORAMIDOTHIONATE (COMPOUND 13)

O-(2-naphthyl), N-propyl phosphoramidochloridothionate (Compound No. 9) in the amount of 67.4 grams (0.25 mol) was dissolved in 200 ml. of methanol and heated to refluxing temperature. 13.5 grams of sodium methoxide (0.25 mol) was then dissolved in 150 ml. methanol and added under stirring dropwise under continued refluxing to the first mentioned solution. Refluxing and stirring was continued for three hours and then the reaction mixture was cooled to —20° C. and filtered to remove the sodium chloride formed. The methanol was then removed by distillation under vacuum and the crude product distilled through a Vigreaux column at 171° C. at 900 microns. O-(2-naphthyl), O'-methyl, N-propyl phosphoramidothionate:

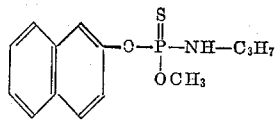

was obtained, having a boiling point of 171° C. at 900 microns and a refractive index $N_D^{20}$ 1.6060. The elemental analysis agreed with the calculated values.

EXAMPLE 14.—PREPARATION OF O-(2-NAPHTHYL), O'-METHYL, N-ISOPROPYL PHOSPHORAMIDOTHIONATE (COMPOUND NO. 14)

O-(2-naphthyl), N-isopropyl phosphoramidochloridothionate (Compound No. 10) in the amount of 74.9 grams (0.25 mol) was dissolved in 400 ml. methanol and the solution heated to reflux. Sodium methoxide in the amount of 13.5 grams dissolved in 100 ml. of methanol was added dropwise with stirring to the first mentioned solution and after the addition was completed refluxing was continued for two to four hours. The reaction mixture was then cooled to —10° C. and filtered. The solids residue contained the product and sodium chloride. The residue was then washed with water to remove the sodium chloride. The residual product was recrystallized from methanol and O-(2-naphthyl), O'-methyl, N-isopropyl phosphoramidothionate was obtained in good yield as product. The melting point of the product was 88–89° C.

EXAMPLE 15.—PREPARATION OF O-(2-NAPHTHYL), O'-ETHYL, N,N-DIMETHYL, PHOSPHORAMIDOTHIONATE (COMPOUND NO. 15)

O-(2-naphthyl), N,N-dimethyl phosphoramidochloridothionate (Compound No. 7) in the amount of 71.4 grams (0.25 mol) was dissolved in 200 ml. ethanol and the solution heated to reflux. A solution of sodium ethoxide (17 grams=0.25 mol) was prepared by dissolving 5.72 grams of sodium (0.25 mol) in 200 ml. of ethanol, and added dropwise to the first mentioned solution at refluxing temperature. Refluxing was continued for four hours, after completion of the dropwise addition. The reaction mixture was then cooled to −20° C. and the sodium chloride partially removed by filtration. The filtrate, which solidified, was then added to 800 ml. of water and the resulting slurry filtered to remove the sodium chloride and ethanol. The residue was then recrystallized from methanol. O-(2-naphthyl), O'-ethyl, N,N-dimethyl phosphoramidothionate was obtained as product which exhibited a melting point of 53–55° C.

EXAMPLE 16.—PREPARATION OF O-(2-NAPHTHYL), O'-ETHYL, N,N-DIETHYL PHOSPHORAMIDOTHIONATE (COMPOUND NO. 16)

This preparation was carried out in the same manner as described in Example 7, using as reactant 78.4 grams of (0.25 mol) O-(2-naphthyl), N,N-diethyl phosphoramidochloridothionate (Compound No. 8). The sodium ethoxide solution was the same. The reaction product was a liquid and the sodium chloride was removed by filtration. The filtrate was stripped of ethanol by vacuum distillation and the crude reaction product was purified by distillation at 100 to 200 microns and at temperatures of 230–240° C. The recovered O-(2-naphthyl), O'-ethyl, N,N-diethyl phosphoramidothionate had a boiling range of 230–240° C. at 100–200 microns, a refractive index $N_D^{20}$ 1.5806 and a density $D_{20}^{20}$ 1.191.

EXAMPLE 17.—PREPARATION OF O-(2-NAPHTHYL), O'-ETHYL, N-PROPYL PHOSPHORAMIDOTHIONATE (COMPOUND NO. 17)

O-(2-naphthyl), N-propyl phosphoramidochloridothionate (Compound No. 9) in the amount of 67.4 grams (0.25 mol) was dissolved in 200 ml. of ethanol and the solution heated to reflux. Sodium was dissolved in 150 ml. of ethanol to yield 0.25 mol of sodium ethoxide in solution. This solution was added dropwise with agitation to the first mentioned solution while refluxing. Agitation and refluxing was continued for three hours and the reaction completed as described in Example 16. The boiling range of the recovered product O-(2-naphthyl), O'-ethyl, N-propyl phosphoramidothionate was 230–240° C. at 600 microns pressure and its refractive index $N_D^{20}$ was 1.5817.

EXAMPLE 18.—PREPARATION OF O-(2-NAPHTHYL), O'-ETHYL, N-ISOPROPYL PHOSPHORAMIDOTHIONATE (COMPOUND NO. 18)

O-(2-naphthyl), N-isopropyl phosphoramidochloridothionate (Compound No. 10) in the amount of 74.8 grams (0.25 mol) was dissolved in 400 ml. of ethanol and the solution heated to reflux. Ethanol in the amount of 100 ml. and containing 17 grams of sodium ethoxide (0.25 mol) (obtained from dissolving 5.72 grams Na therein) was added dropwise with agitation to the first mentioned solution at refluxing temperature. Refluxing and agitation was continued after dropwise addition was completed for two to three hours. The reaction mixture was then cooled to −10° C. and the sodium chloride removed by filtration. The solvent was then removed by vacuum distillation at 75–85° C. and the remaining crude product was purified by fractionation in a semi-micro still fitted with a Vigreaux column. The product distilled at 164–166° C. at 600–900 microns. The product O-(2-naphthly), O'-ethyl, N-isopropyl phosphoramidothionate is a solid, having a melting point of 44–47° C. and a refractive index $N_D^{20}$ of 1.5848.

In Group 5 Compounds No. 11 and 15, derived from Compound No. 7, all containing the dimethylamine radical, are solids, as is the parent compound. Compound No. 11 is insoluble in cold methanol and on cooling the reaction mixture containing this compound, the compound coprecipitated with the sodium chloride, requiring washing with water. Compound No. 15 did not precipitate in cold methanol, however after filtration the filtrate solidified and required washing with water and subsequent recrystallization from methanol to yield a white flaky material. The diethylamine radical-containing homologues, Compounds No. 12 and 16, are liquids and were purified in a molecular still. The n-propylamine radical-containing Compounds No. 13 and 17 are also liquids. The isopropylamine radical-containing Compounds No. 14 and 18 are solids. Compound No. 14 precipitated when the reaction mixture was cooled. A single water wash was sufficient to yield a white solid product with a melting point of 88–89° C. which was unaltered after one recrystallization from methanol. Compound No. 18, having a lower melting point, solidified slowly and could be purified by distillation. This product turned into a crystalline solid upon standing.

The following is a summary of the reaction conditions of the 18 examples:

Solvent: Methanol was used in Examples 1 and 11 to 14. Ethanol was used in Examples 2 and 15 to 18. The solvent in Examples 1 and 2 was the excess of one of the reactants. Benzene was used in Examples 3, 4, 7 and 8. Ethyl ether was used in Examples 5, 6, 9 and 10.

Acid acceptor: Triethylamine was used in Examples 5 to 10. Dimethylamine, one of the reactants, was used in Example 4. No acid acceptor was used in Examples 1 to 3. The reaction supplied the acid acceptor in Examples 11 to 18.

Temperature: Generally speaking the reaction temperature is room temperature and lower. Examples 4 and 7 were carried out at room temperature. Example 3 was carried out slightly below room temperature. Examples 1 and 2 were carried out at room temperature, followed by brief refluxing. The other examples were carried out at refluxing temperature.

The herbicidal and biocidal compositions containing the compounds of this invention are prepared in the manner generally know in the art. The compounds are used in conjunction with gaseous, liquid or solid inert carriers customarily employed in the production of herbicidal compositions, such as dusting powders, suspensions, emulsions, solutions, aerosols, wettable powders, etc.

Solvents may include acetone, methyl alcohol, isopropyl acetate, butyl carbitol acetate, isopropyl alcohol, cyclohexane, cyclohexanone, benzene, xylene, methylated naphthalenes (also known as aromatic petroleum solvents), carbon tetrachloride, methyl chloride and others, either alone or in admixture.

Solid carriers may be selected from talc, clay, kaolin, lime, bentonite, pumice, fuller's earth, absorbent silicas, pyrophilite, etc., preferably in finely divided state. These can be applied as herbicidal dusts or as wettable powders with the addition of surface active agents. The latter can be made into water dispersions or suspensions.

For aerosol application liquified gases are used as solvents, such as fluorochlorethanes, fluorochlormethanes or methyl chloride and they are applied from aerosol bombs made from the solutions.

Solutions of compounds and/or compositions of this invention may be converted to water suspensions or emulsions. For the preparation of emulsions or wettable powders surface active agents are incorporated into the compositions of this invention. When preparing emulsions they aid emulsification, whereas in preparing wettable powders they aid suspension and dispersion properties.

The following is a list of some useful surface active agents:

Triton X–161, a blend of alkyl aryl polyether alcohols and organic sulfonates;
Pluronic L–61, a condensate of ethylene oxide with a hydrophobic base formed by condensing propylene oxide with propylene glycol;
Marasperse N, sodium lignosulfonate;
Igepal CO–730, an alkylphenoxypoly(ethylenoxy) ethanol, formed by condensing nonylphenol with ethylene oxide;
Diglycol oleate;
p-Isooctyl phenyl ether of polyethylene glycol;
Polyalkylene glycol derivatives;
Alkylbenzenesulfonates;
Alkene sulfonates;
Alkyl sulfates, such at fatty alcohol sulfates;
Condensation product of 1 mol of octyl phenol with 8 mols of ethylene oxide;
Naphthalene sulfonates and alkyl naphthalene sulfonates;
Ricinoleic acid butyl ester sulfonates;
Emcol H–83T, blend of polyoxyethylene ethers and oil soluble sulfonates; and
Agrimul GM, aromatic sulfonate-oxide blend.

Water suspensions can be prepared by dissolving the water-insoluble active compound in a water miscible solvent, like acetone, and adding this solution to water under agitation. In another method a water wettable dry powder mixture is prepared, e.g., containing a water dispersible clay carrier, with or without the presence of surface active agents and this mixture is dispersed in water prior to use.

Concentrated herbicidal and/or biocidal compositions may contain 0.1% to 30% by weight of active compound and 99.9% to 70% of inert carrier, such as solvent, water, solid powder carriers, surface active agents and their admixture.

The eighteen compounds of the examples have been screened for herbicidal and/or biocidal activity by various test methods. These are numbered for ease of reference.

*Test Method No. 1.—Pre-emergent herbicidal screening*

12″ x 12″ flats were prepared containing rows of crops as follows: beans, corn, radish, oats and ryegrass. This was overseeded with a "soil-weed seed mixture" containing crabgrass, crimson clover, pigweed and lamb's-quarter. The compounds to be tested were prepared as 10% stock acetone solutions and these stock solutions were diluted to 1% active compound content immediately before application. The diluent for the stock solutions was a 0.1% solution of Igepal CO–730 in water. Compounds insoluble in acetone, like Compound No. 3, were mixed with water dispersible clay and applied also from suspensions containing 1% active compound. 20 ml. of 1% active solution or dispersion was sprayed uniformly over the area of the flats. This was calculated to correspond to a rate of about 19 pounds per acre of active compound. Growth and germination effects were noted periodically after treatment. Weights of pre-emergent row crops were taken in addition to counts and ratings. On overseed weed population actual counts were taken instead of just ratings.

Compounds No. 1, 2, 4 and 6 to 18 were tested with this method. Controls were run with acetone alone and with surfactant alone in a manner that active compound was absent and the concentration of acetone and the surfactant, respectively, was at the same level as with the preparations containing the active compounds. The results reported below relate to effects only, which showed interest when compared with the two controls. Where results are not mentioned with a particular crop, this means that no effect was noticed vs. the controls.

Compound No. 1 showed significant effect with ryegrass and crabgrass. Additionally dwarfing and distortion was noticed on surviving crabgrass.

Compound No. 2 showed some effect on radish, significant effect on crabgrass, crimson clover and pigweed, with dwarfing and distortion on surviving crabgrass.

Compound No. 6 showed some effect on oats and significant effect on ryegrass and pigweed.

Compound No. 7 showed some effect on oats, significant effect on ryegrass, crabgrass, crimson closer, pigweed and lamb's-quarter, with dwarfing and distortion on surviving crabgrass.

Compound No. 8 showed some effect on oats and crabgrass (dwarfing) and significant effect on pigweed.

Compound No. 9 showed some effect on crimson clover.

Compound No. 10 showed some effect on radish, significant effect on oats and crabgrass, with dwarfing and distortion on surviving crabgrass.

Compound No. 11 showed some effect on corn and was inactive on the other crops.

Compound No. 12 showed some effect on oats, significant effect on ryegrass, crabgrass and pigweed, with dwarfing and distortion on surviving crabgrass.

Compound No. 13 had some effect on corn, significant effect on radish, crabgrass and pigweed, with dwarfing and distorting surviving crabgrass.

Compound No. 14 had some effect on corn and crabgrass with dwarfing and distorting the latter.

Compound No. 15 had significant effect on ryegrass.

Compound No. 16 had significant effect on ryegrass and pigweed.

Compound No. 17 had some effect on radish and significant effect on ryegrass and pigweed.

Compound No. 18 had very substantial effect on crabgrass with strong dwarfing and distortion on the surviving plants.

All the effects listed above were to the negative, except with ryegrass. Summarized below are the results with the individual crops with the herbicidally most active compounds listed first and least active ones last.

Beans were not effected. Some effect was shown on corn with Compounds No. 14, 11 and 13. Radish was significantly affected by Compound No. 13 and some effect was shown with Compounds No. 10, 17 and 2. Oats were significantly affected by Compound No. 10 and some effect was shown by Compounds No. 7, 6, 8 and 12. On ryegrass the effect was increased weight vs. the controls, most active to least active: Compounds No. 7, 15, 12, 17, 1, 16 and 6. The activity on crabgrass was as follows: Compounds No. 18, 1, 2, 10, 13, 12, 7, 8 and 14. The last two showed some effect and the others significant effect. On crimson clover active were: Compounds 7, 2 and 9. On pigweed significant effect was shown by Compounds 7, 12, 8, 13, 17, 16 and 18. On lamb's-quarter significant effect was shown by Compound No. 7.

Additional greenhouse tests were made with two of the compounds for pre-emergent crabgrass control. Compounds No. 1 and 18 were tested and showed selective pre-emergent control of crabgrass without damage to any of several legumes (sweet clover, alfalfa, etc.). The active range for Compound No. 1 [O-(2-naphthyl), O′, O″-dimethyl phosphorothionate] was 28 to 42 pounds per acre, and for Compound No. 18 [O-(2-naphthyl), O′-ethyl, N-isopropyl phosphoramidothionate] 14 to 28 pounds per acre.

*Test Method No. 2.—Post-emergent herbicidal screening*

In this test stock solutions of 10% active compound content in acetone were used. The flats were in duplicate and their size was 12″ x 18″. The post-emergent sprays were applied in two parts: (a) 3 ml. of the 10% stock solution was sprayed evenly on the plants in the flats, followed by (b) 10 ml. of an aqueous solution of 0.1% of Igepal CO–730. The surface active agent was used to improve penetration of leaves and plant surface. The procedure was adopted to avoid possible precipitation with some of the compounds upon direct dilution. Spraying was by precision equipment and liquid quantities were used below the run-off point. Eight crops were used; as dicots: bush bean, radish, tomato, pigweed and crimson clover, and as monocots: oats, crabgrass and ryegrass. Pigweed was planted first in the flats, followed in 5 days with radish, ryegrass, clover and crabgrass. Four more days later beans and oats were planted with the tomato transplants. This gave better size distribution of the various plants at treating time, fourteen additional days later. Post-emergent ratings were made 3, 7 and 14 days after treatments. With compounds insoluble in acetone wettable powder mixtures were made with water dispersible clay granules and this was diluted to proper concentration with the Igepal solution. The dosage used is estimated to be equal to about 19 pounds per acre of active compound. Some of the compounds, as it will be indicated, were tested additionally at a dosage level of 13.6 pounds per acre.

Ratings were given to indicate with zero no effect and with twenty complete kill. These ratings were repeated on the three days on which observation was made. If the ratings at later date increased or remained equal, the damage was of permanent nature. If the later ratings were lower, this indicated some signs of recovery. Listed below is the order of activity for the individual compounds on the various plants, first mentioning the greatest activity and last the lowest.

GROUP 1 (BOTH CHLORINE ATOMS SUBSTITUTED BY O-ALKYL GROUPS)

Compound No. 1 (O-methyl) showed the following order of activity: (1) crabgrass, (2) oats, (3) and (4) radish and pigweed, (5) tomoto (recovered), (6) ryegrass, (7) crimson clover, (8) bush bean.

Compound No. 2 (O-ethyl) order of activity: (1) oats, (2) crabgrass, (3) and (4) radish and pigweed, (5) crimson clover, (6) and (7) ryegrass and bush bean, and (8) tomato. Compound No. 2 was more active than No. 1.

GROUP 2 (BOTH CHLORINE ATOMS N-SUBSTITUTED WITH AMINE RADICALS)

Compound No. 3 showed little activity, except rating 2 on oats.

Compound No. 4 was also rather inactive. Permanent damage on oats and ryegrass only. Best with oats, the rest not significant.

GROUP 3 (ONE CHLORINE ATOM SUBSTITUTED WITH AN O-ARYL RADICAL)

Compound 5 was not tested in this set.

Compound No. 6 (O-p-cresyl) was rather inactive. Best with oats.

GROUP 4 (ONE CHLORINE ATOM SUBSTITUTED WITH AN AMINE RADICAL

Compound No. 7 (N,N-dimethyl), order of activity: (1) crabgrass, (2) oats, (3) pigweed (does not recover), (4) radish, (5) bush bean, (6) and (7) tomato and crimson clover and (8) ryegrass.

Compound No. 8 (N,N-diethyl), order of activity: (1) crabgrass, (2) pigweed (does not recover), (3) to (6) bush bean, radish, tomato (does not recover), oats, (7) and (8) inactive on crimson clover and ryegrass. General activity: distinct, but low.

Compound No. 9 (N-propyl), order of activity: (1) pigweed (does not recover), (2) crabgrass (permanent damage), (3) oats, (4) tomato, (5) radish, (6) bush bean, (7) ryegrass, and (8) crimson clover.

Compound No. 10 (N-isopropyl), order of activity: (1) crabgrass (does not recover), (2) pigweed, (3) oats, (4) and (5) radish and tomato, (6) bush bean. Inactive on crimson clover (7) and ryegrass (8).

In this group Compound No. 9 is best and Compound No. 8 is weakest. Compounds No. 7 and 10 are close in the middle of the group.

GROUP 5 (SUBGROUP I)

Compound No. 11, order of activity: (1) radish (does not recover), (2) to (4) tomato, oats, crabgrass, (5) pigweed (does not recover), (6) crimson clover. Inactive on ryegrass (7) and bush bean (8). General activity: distinct, but low.

Compounds No. 12, order of activity: (1) pigweed (does not recover), (2) crabgrass, (3) tomato, (4) radish, (5) oats, (6) to (8) bush bean, crimson clover, ryegrass. This compound shows the strongest activity of the compounds tested in this set.

Compound No. 13, order of activity: (1) crabgrass, (2) radish, (3) pigweed, (4) oats, (5) tomato, (6) ryegrass, (7) crimson clover and (8) bush bean. This compound showed good general activity.

Compound No. 14, order of activity: (1) crabgrass (does not recover), (2) tomato (does not recover), (3) oats, (4) radish, (5) bush bean, (6) pigweed, (7) crimson clover and (8) ryegrass. This compound shows distinct medium to low activity.

GROUP 5 (SUBGROUP II)

Compound No. 15, order of activity: (1) oats, (2) crabgrass, (3) radish, (4) crimson clover, (5) bush bean (does not recover), (6) pigweed, (7) and (8) inactive on tomato and ryegrass. This compound has distinct, but low general activity.

Compound No. 16, order of activity: (1) crabgrass, (2) and (3) radish and pigweed, (4) oats, (5) bush bean, (6) tomato, (7) crimson clover, (8) ryegrass. Distinct, but low activity.

Compound No. 17, order of activity: (1) crabgrass, (2) pigweed (does not recover), (3) oats, (4) radish (does not recover), (5) bush bean, (6) crimson clover, (7) ryegrass, (8) tomato. General activity: distinct, but low.

Compound No. 18, order of activity: (1) crabgrass, (2) oats, (3) pigweed, (4) tomato, (5) bush bean, (6) ryegrass, (7) and (8) radish and crimson clover. This compound is more active, but still in the lower range.

Compounds No. 1 and 10 were tested at 13.6 pounds per acre dosage. They were tested in another set at 19 pounds per acre dosage also. Compound No. 1 showed moderate total activity with some selectively. It gave almost complete control of pigweed, with moderate permanent damage to all the other plants. Compound No. 10 showed moderately selective activity to pigweed seedlings in 24 hours, with no recovery. Damage to radish, crabgrass and oats were shown in 7 days, with slight tendency to recover.

In post-emergent herbicidal screening tests and in interpreting the results obtained, one has to consider, that most herbicidally active compounds require formulation evaluation. Emulsion concentrates can be prepared with various solvents and solvent mixtures. The emulsifying agent can be varied. The percentage of active compound and emulsifying agent in the emulsion concentrate may be varied. The establishment of proper solvent, proper emulsifying agent and proper proportions can improve activity manyfold. The same applies to wettable powder concentrates, where the solid carrier and surface active agent, together with proportions may be varied.

A typical formulation for an emulsion concentrate is:

| | Percent by wt. |
|---|---|
| Active compound | 10 |
| Emulsifying agent | 10 |
| Solvent | 80 |

Suitable emulsifying agents are, e.g., Triton X–161, Emcol H–83T and Agrimul GM. All three of these emulsifying agents are blends of anionic and nonionic surface active agents. They are described elsewhere in this specification.

Examples for solvents are: Espesol 5; Velsicol AR 50G; kerosene; 20% methyl acetate and 80% Velsicol AR 50G; phenyl Cellosolve; 10% butyl Carbitol acetate and 90% xylene; #9 oil; 25% isopropyl acetate and 75% #9 oil; 25% methyl isobutyl ketone and 75% kerosene. Espesol 5 is a xylene type solvent derived from petroleum (Sp. Gr. 0.860 to 0.870, boiling range 138° C. to 141.5° C.). Velsicol AR 50G is a rather high boiling methylated naphthalene hydrocarbon solvent, having a K.B. value of 80, initial boiling point of 390° F. and end point of 550° F. #9 oil is a high boiling point petroleum hydrocarbon oil, similar to paraffin oil. In the above typical formulation the concentration of the active compound could be increased to 20% and 30%, e.g., while reducing the solvent content correspondingly to 70% and 60%. Also the quantity of the emulsifying agent could be varied.

As an example for a wettable powder concentrate we may prepare first a pre-mix of

| | Percent |
|---|---|
| Hi-Sil 232 | 92 |
| Marasperse N | 4 |
| Pluronic L-61 | 4 | all percentages by weight. Hi-Sil 232 is a silica material. Marasperse N and Pluronic L-61 are described hereinbefore. The wettable powder concentrate can consist of 25% of the active compound and 75% of the pre-mix. All percentages are by weight.

Three of the compounds, Nos. 5, 11 and 14, were tested for other uses such as biocidal activity. These tests are described below.

*Test Method No. 3.—Nematocidal activity*

The object of this test was to determine nematocidal activity of the compounds of this inventoin against a species of Panagrellus, an active saprozoic nematode. The nema were collected from the culture medium in a routine manner to insure their freedom from food contamination and uniformity of age by means of a Baerman funnel technique. The screening was carried out in stoppered test tubes containing 10 ml. of the chemical-dosage to be tested on the nematode population, at the time of seeding adjusted to 50–75 per tube. The tests were run in duplicate and the check or blank contained nema in tap water. The nematodes, when properly handled, survived at least seven days in the blanks without the addition of food. Microscopic observations on the behavior of the nema were made daily over a period of 5 to 7 days to establish the point of kill. The constant and active movement of this species permitted easy identification of live and dead individuals. The rapid and short cycle of reproduction by parthenogenesis permitted observations on the effect of the chemical compounds on reproductive behavior and also on individuals of different ages. Dosages were arrived at from wettable powder concentrates described immediately above. Compound No. 5, O-(2-naphthyl, O'-(2,4-dichlorophenyl) phosphorochloridothionate was tested by this method. At 500 p.p.m. concentration in one day it gave 65% mortality and in three days 100% mortality of the test species. In the check, without the active agent the mortality was zero percent up to five days.

*Test Method No. 4.—Fungicidal activity*

The object of this test was to determine the effect of the compounds of this invention in inhibiting growth of fungus, Helminthosporium avenae, contained within and on the surface of naturally infected oat seed. Oat seeds known to be heavily infected with Helminthosporium avenae, were treated with the candidate compound at various dosages for a period of fifteen minutes by immersion. At the end of this period the solution was drained off and the seeds were placed out on Petri dishes containing mositened filter paper. Lack of control was evident by the dark colored organism sporulating in profusion on the seed surface and on the filter paper adjoining the seed.

Data were taken on the percentage of disease control at appropriate intervals after initiation of the test. As source of the dosage the same wettable powder concentrate was used, as described above and used in Test Method No. 3. Compound No. 11, showed the following values: at 5000 p.p.m. 0% germination and 92% disease control, at 500 p.p.m. 26% germination and 76% disease control, at 50 p.p.m. 36% germination and 44% disease control. The check (blank) showed 38% germination and 26% disease control. Compound No. 11 showed fungicidal activity at 5000 p.p.m. and 500 p.p.m. concentrations. Compound No. 14 showed at the three concentrations tested 62 to 74% disease control and no reduction in germination vs. the control. It had moderate fungicidal activity. Compound No. 5 showed at 5000 p.p.m. concentration double the disease control of the check.

*Test Method No. 5.—Contact exposure with Drosophila melanogaster*

Insecticidal activity tests were carried out with Drosophila (pomace fly) cultures in routine manner under controlled temperature and humidity conditions. The breeding and rearing cycle were handled in a manner to assure testing of adults of uniform age. Test compounds were deposited within 200 ml. test tubes (25 mm. x 200 mm.) in a volatile solvent, such as acetone, and immediately mechanically rotated to obtain a thin film of the test compound on the walls of the test vessels. Ten flies were released into each test vessel (tube) and then stoppered with an absorbent cotton plug holding a protruding tip (dental gum) impregnated with sufficient liquid food to carry the flies for three days. At 1000 p.p.m. dosage level Compounds Nos. 11 and 14 gave the following results:

| | Percent kill | |
|---|---|---|
| | 24 hours | 48 hours |
| Compound No. 11 | 95% | 100% |
| Compound No. 14 | 100% | 100% |
| Check | 0% | 12% |

Both of the tested compounds showed insecticidal activity against Drosophila. Compound No. 11 showed activity within two hours. In a similarly conducted test against confused flour beetle (Tribolium confusum) at 2500 p.p.m. dosage level Compound No. 11 showed 41% kill and Compound No 14: 30% kill in five days, vs. 0% kill of the check. These tests were carried out in Petri dishes.

In summarizing the findings with respect to the various compounds, additional information is supplied with respect to the compounds having post-emergent phytotoxicity ratings (P.R.) in Test Method No. 2 over P.R. 10.

Compound No. 1: In post-emergent tests over PR. 10 were two (crabgrass and oats). Good results with radish and pigweed. Good activity at 19 lbs./acre, fair activity at 13.6 lbs./acre. After 20 days still good crabgrass control. In pre-emergent tests fair to good activity on crabgrass. It increased ryegrass growth.

Compound No. 2: In post-emergent tests over P.R. 10 were four (oats, crabgrass, pigweed and radish). Fair activity, rapid effect on radish, inhibits crabgrass growth. Wilts or dehydrations on radish within 6 hours. Good crabgrass inhibition after 20 days. In pre-emergent tests fair activity on crabgrass, crimson clover and pigweed.

Compound No. 3: In post-emergent testing inactive, except on oats in 14 days. Not present in pre-emergent testing.

Compound No. 4: In post-emergent testing none of the P.R. values were over 10. Best results with oats. Effect on other crops not significant. Inactive in pre-emergent testing.

Compound No. 5: Was not tested for post-emergent or pre-emergent effect. It exhibited nematocidal activity in Test Method No. 3.

Compound No. 6: In post-emergent testing no P.R. over 10. Oats is best, others not significant. In pre-emergent testing fair to good activity on pigweed.

Compound No. 7: In post-emergent tests three reached P.R. 10 or over (pigweed, crabgrass and oats). Lasting crabgrass control. Inhibited internode elongation on beans (growth inhibitor). In pre-emergent testing fair to good activity on crabgrass with control of other overseeded crops.

Compound No. 8: In post-emergent testing none of the P.R. values reached 10. Best were crabgrass and pigweed. Pigweed and tomato did not show recovery. Inactive on crimson clover and ryegrass. In pre-emergent testing slight growth restriction on crabgrass, effective on pigweed.

Compound No. 9: In post-emergent testing four reached P.R. 10 and over [pigweed (very good), crabgrass (very good), oats and tomato]. No recovery on pigweed and crabgrass. Generally fairly good activity. Permanent effect on crabgrass, inhibits its growth. Crabgrass—selective. After 20 days continued crabgrass control and inhibition. In pre-emergent testing inactive.

Compound No. 10: In post-emergent testing one reached P.R. 10 and over at 13.6 lbs./acre. Crabgrass, followed with good results on crimson clover and oats. At 19 lbs./acre pigweed was best with over P.R. 10 and crabgrass follows. It has permanent selective effect on crabgrass and showed after 20 days good crabgrass control. In pre-emergent tests fairly good activity on crabgrass and oats.

Compound No. 11: In post-emergent work none reached P.R. 10. Permanent effect on radish and pigweed. Inactive on bush bean and ryegrass and active as fungicide. Had good insecticidal activity on Drosophila and some on confused flour beetle.

Compound No. 12: In post-emergent testing very good activity, four reached P.R. 10 and over (pigweed, crabgrass, tomato and radish). Pigweed gave an average P.R. of 19.7 and was permanently affected, without recovery. It showed rapid effect on radish. Wilt or dehydration on radish within 6 hours. Specific action: dwarfing or death of tomatoes within 20 days. In pre-emergent testing, activity on crabgrass and pigweed and reduced radish growth.

Compound No. 13: Good activity in post-emergent testing. Four reached P.R. 10 or over (crabgrass, radish, pigweed and oats). Rapid effect on radish and clover. Wilts or dehydration on radish within 6 hours and acted similarly on clover. In pre-emergent testing, active on crabgrass and pigweed and reduced radish growth.

Compound No. 14: In post-emergent testing medium to low activity. Acted on all 8 crops, but none reached P.R. 10. Best: Crabgrass, tomato and oats. Dwarfed crabgrass and distorted bean leaves. In 20 days: still dwarfed crabgrass and permanently distorted bean leaves. In pre-emergent testing some growth restriction on crabgrass. It showed good insecticidal activity against Drosophila and some against confused flour beetle.

Compound No. 15: In post-emergent tests the activity was low, and in pre-emergent testing increased ryegrass growth.

Compound No. 16: In post-emergent test the activity was low, none reached P.R. 10 and crabgrass, radish and pigweed were best. In pre-emergent tests, fair to good activity on pigweed and increased ryegrass growth.

Compound No. 17: In post-emergent tests activity low, pigweed and radish were permanently affected. In pre-emergent testing compound was active on pigweed.

Compound No. 18: In post-emergent testing, moderate activity. In pre-emergent test it showed good activity on crabgrass.

The effect of increased ryegrass growth in pre-emergent testing is considered as indirect evidence of phytotoxic activity on the over-seed crops, which normally would retard the development of ryegrass.

As will be apparent to those skilled in the art in the light of the foregoing disclosure, many modifications, substitutions, and additions are possible and will suggest themselves without departing from the spirit and scope of this invention.

We claim:
1. A derivative of O-(2-naphthyl) phosphorodichloridothionate having the general structure of

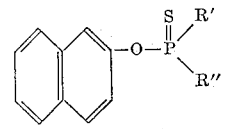

wherein $R'$ is a member of the class consisting of O-alkyl radicals, amine radicals and chlorine, wherein $R''$ is a member of the class consisting of O-alkyl, O-monocyclic aryl and amine radicals and wherein said amine radicals have the general structure of

said $R_{(1)}$ and $R_{(2)}$ being a member of the class consisting of hydrogen and alkyl radicals, the alkyl radical present in said derivative having 1 to 5 carbon atoms.

2. The compound of claim 1, wherein $R''$ is a ring-substituted O-monocyclic aryl radical, the substituent being a member of the class consisting of alkyl, alkoxy and halogen groupings.

3. The compound of claim 1, wherein $R'$ and $R''$ are identical O-alkyl radicals.

4. The compound of claim 1, wherein $R'$ is chlorine and $R''$ is an amine radical.

5. The compound of claim 1, wherein $R'$ is an O-alkyl radical and $R''$ is an amine radical.

6. O-(2-naphthyl), O',O''-diethyl phosphorothionate.

7. O-(2-naphthyl), O',O''-dimethyl phosphorothionate.

8. O - (2 - naphthyl), N,N - dimethyl phosphoramidochloridothionate.

9. O-(2-naphthyl), O'-methyl, N,N-diethyl phosphoramidothionate.

10. O-(2-naphthyl), O'-ethyl, N-isopropyl phosphoramidothionate.

References Cited

UNITED STATES PATENTS

| | | | |
|---|---|---|---|
| 2,400,577 | 5/1946 | Toy | 260—950 |
| 2,668,838 | 2/1954 | Tolkmith | 260—959 |
| 2,668,839 | 2/1954 | Tolkmith | 260—959 |

CHARLES B. PARKER, *Primary Examiner.*

BERNARD BILLIAN, *Assistant Examiner.*